United States Patent
Darsi et al.

(10) Patent No.: US 12,236,245 B2
(45) Date of Patent: Feb. 25, 2025

(54) GROUP THREAD DISPATCH FOR GRAPH STREAMING PROCESSOR

(71) Applicant: Blaize Inc., El Dorado Hills, CA (US)

(72) Inventors: Kota Vamsi Krishna Darsi, Hyderabad (IN); Sarvendra Govindammagari, Hyderabad (IN); Venkata Divyabharathi Palaparthy, Hyderabad (IN); Venkata Ganapathi Puppala, Hyderabad (IN); Satyaki Koneru, Folsom, CA (US)

(73) Assignee: Blaize Inc., El Dorado Hills, CA (US)

( * ) Notice: Subject to any disclaimer, the term of this patent is extended or adjusted under 35 U.S.C. 154(b) by 70 days.

(21) Appl. No.: 18/208,365

(22) Filed: Jun. 12, 2023

(65) Prior Publication Data

US 2024/0411560 A1 Dec. 12, 2024

(51) Int. Cl.
*G06F 9/30* (2018.01)
*G06F 9/38* (2018.01)

(52) U.S. Cl.
CPC ........ *G06F 9/3851* (2013.01); *G06F 9/30043* (2013.01); *G06F 9/3887* (2013.01); *G06F 9/30036* (2013.01); *G06F 9/30098* (2013.01); *G06F 9/3888* (2023.08)

(58) Field of Classification Search
CPC .. G06F 9/3851; G06F 9/30043; G06F 9/3887; G06F 9/30036; G06F 9/30098; G06F 9/3888

See application file for complete search history.

(56) References Cited

U.S. PATENT DOCUMENTS

| | | |
|---|---|---|
| 5,796,645 A | 8/1998 | Peh et al. |
| 5,930,160 A | 7/1999 | Mahant-Shetti |
| 6,298,366 B1 | 10/2001 | Gatherer et al. |
| 6,904,446 B2 | 6/2005 | Dibrino |
| 8,972,703 B2 * | 3/2015 | Frigo ............... G06F 9/4843 712/220 |
| 11,372,677 B1 * | 6/2022 | Geva ................. G06N 3/02 |
| 11,416,261 B2 * | 8/2022 | Koneru .............. G06F 9/3877 |
| 11,481,223 B2 | 10/2022 | Thangam et al. |
| 2005/0033944 A1 | 2/2005 | Wadleigh |
| 2009/0100122 A1 | 4/2009 | Zheng et al. |
| 2010/0274990 A1 | 10/2010 | Wilder et al. |
| 2011/0088041 A1 | 4/2011 | Alameldeen et al. |
| 2012/0221830 A1 | 8/2012 | Faanes et al. |

(Continued)

*Primary Examiner* — Corey S Faherty
(74) *Attorney, Agent, or Firm* — Brian R. Short

(57) ABSTRACT

Methods, systems. and apparatuses for graph streaming processing are disclosed. One method includes receiving, by a thread scheduler, a group of threads, calculating a resource requirement for execution of the group of threads, calculating resource availability in a plurality of processors of each of a plurality of processor arrays, dispatching the group of threads to a selected one of plurality of processors of processor arrays, scheduling a group load instruction for all threads of the group of threads, including loading into a group load register a subset of inputs of the input tensor for processing of each thread of the group of threads, wherein the group load register provides the subset of the inputs of the input tensor to the group of threads of the selected one of the plurality of processors, wherein all threads of the group of threads are synchronized when executing the group load instruction.

20 Claims, 9 Drawing Sheets

(56) References Cited

U.S. PATENT DOCUMENTS

2018/0341495 A1   11/2018  Culurciello et al.
2020/0293867 A1*   9/2020  Shao .................... G06F 9/3001
2020/0409705 A1   12/2020  Ould-Ahmed-Vall et al.
2021/0042127 A1*   2/2021  Koneru ................ G06F 9/3877

* cited by examiner

Receiving, by a thread scheduler of the graph streaming processor, a group of threads, wherein the group of threads comprises a plurality of threads which operate on an input tensor, wherein each of the plurality of threads operates on the inputs of the input tensor and a subset of a weight tensor to generate a subset of an output tensor
910

Calculating by the thread scheduler, a resource requirement for execution of the group of threads
920

Calculating, by the thread scheduler, resource availability in a plurality of processors of each of a plurality of processor arrays
930

Dispatching the group of threads to a selected one of the plurality of processors of the plurality of processor arrays that has a resource availability that meets or exceeds the resource requirement for execution of the group of threads
940

Scheduling a group load instruction for all threads of the group of threads, comprising loading into a group load register a subset of inputs of the input tensor for processing of each thread of the group of threads, wherein the group load register provides the subset of the inputs of the input tensor to the group of threads of the selected one of the plurality of processors, wherein all threads of the group of threads are synchronized when executing the group load instruction, wherein all threads of the group of threads are processed independently on the selected one of the plurality of processors when not executing the group load instruction, and wherein the processing of each thread of the group of threads comprises generating a subset of outputs of the output tensor for each thread of the plurality of threads based on the subset of weights of the weight tensor and the inputs of the input tensor.
950

FIGURE 9

GROUP THREAD DISPATCH FOR GRAPH STREAMING PROCESSOR

FIELD OF THE EMBODIMENTS

The described embodiments relate generally to graph stream processing. More particularly, the described embodiments relate to methods, apparatuses and systems for group thread dispatch for graph streaming processor.

BACKGROUND

Neural networks are made up of a series of layers where each layer has multiple inputs and multiple outputs. Each input and output is a two-dimensional feature map. Each input is connected to and contributes to each output in weighted fashion. The compute pipeline has operations which are fundamentally a multiply-accumulate (MAC). A MAC involves multiplying two source operands and accumulating the result into the destination operand. Variations of the MAC operations are used extensively in neural networks, including dot-product-accumulate and convolve-accumulate. The two source operands and the destination operand need to be read from the register file and fed into the compute pipeline. The operation is performed and the result accumulated into the destination and written back.

It is desirable to have a method, apparatus and system for group thread dispatch for graph streaming processor.

SUMMARY

One embodiment includes a method of graph streaming processing. The method includes receiving, by a thread scheduler of a Graph Streaming Processor, a group of threads, wherein the group of threads comprises a plurality of threads which operate on an input tensor, wherein each of the plurality of threads operates on the inputs of the input tensor and a subset of a weight tensor to generate a subset of an output tensor, calculating by the thread scheduler, a resource requirement for execution of the group of threads, calculating, by the thread scheduler, resource availability in a plurality of processors of each of a plurality of processor arrays, dispatching the group of threads to a selected one of the plurality of processors of the plurality of processor arrays that has a resource availability that meets or exceeds the resource requirement for execution of the group of threads; and scheduling a group load instruction for all threads of the group of threads, including loading into a group load register a subset of inputs of the input tensor for processing of each thread of the group of threads, wherein the group load register provides the subset of the inputs of the input tensor to the group of threads of the selected one of the plurality of processors, wherein all threads of the group of threads are synchronized when executing the group load instruction, wherein all threads of the group of threads are processed independently on the selected one of the plurality of processors when not executing the group load instruction, wherein the processing of each thread of the group of threads comprises generating a subset of outputs of the output tensor for each thread of the plurality of threads based on the subset of weights of the weight tensor and the inputs of the input tensor.

Another embodiment includes a graph streaming processor. The graph streaming processor includes a plurality of processor arrays, each array comprising a plurality of processors, and a thread scheduler configured to receive a group of threads of the graph streaming processor, wherein the group of threads comprises a plurality of threads which operate on an input tensor, wherein each of the plurality of threads operates on the inputs of the input tensor and a subset of a weight tensor to generate a subset of an output tensor, calculate a resource requirement for execution of the group of threads, calculate resource availability in a plurality of processors of each of a plurality of processor arrays, dispatch the group of threads to a selected one of the plurality of processors of the plurality of processor arrays that has a resource availability that meets or exceeds the resource requirement for execution of the group of threads, schedule a group load instruction for all threads of the group of threads, including loading into a group load register a subset of inputs of the input tensor for processing of each thread of the group of threads, wherein the group load register provides the subset of the inputs of the input tensor to the group of threads of the selected one of the plurality of processors, wherein all threads of the group of threads are synchronized when executing the group load instruction, wherein all threads of the group of threads are processed independently on the selected one of the plurality of processors when not executing the group load instruction, and wherein the processing of each thread of the group of threads comprises generating a subset of outputs of the output tensor for each thread of the plurality of threads based on the subset of weights of the weight tensor and the inputs of the input tensor.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a flow chart that includes steps of a method of graph streaming processing that includes a group load register, according to an embodiment.

DETAILED DESCRIPTION

The described embodiments are embodied in methods, apparatuses and systems for a hardware architecture that supports SIMD (single input, multiple data) processing of an input tensor that includes a group load register, resulting in a output tensor.

Figure 1:
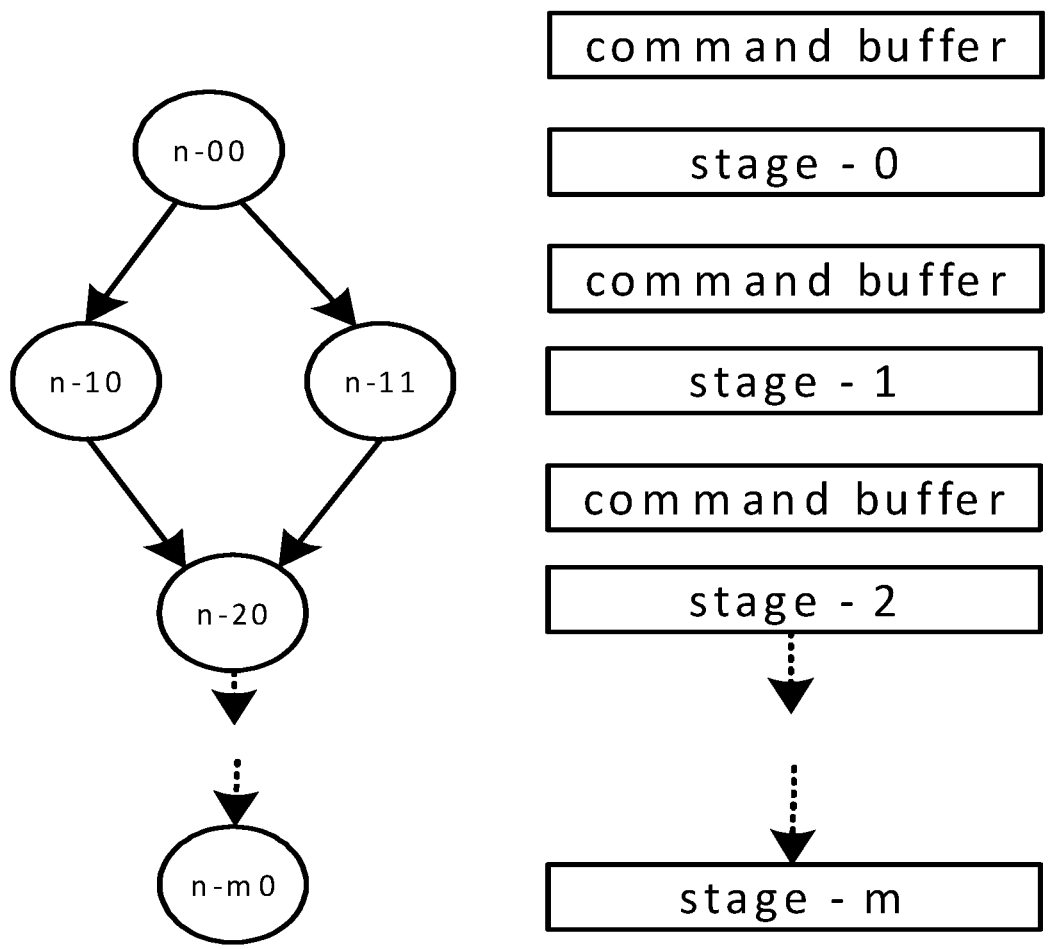
FIG. 1 shows stages of graph streaming processing, according to an embodiment.

FIG. 1 shows stages of graph streaming processing, according to an embodiment. The GSP architecture is designed for execution of acyclic data flow graphs in streaming manner, where, a graph is made of connected nodes, the arcs between the nodes of the graph indicate the dependency between them. Each node in the dataflow graph consists of a function that processes the data buffers produced by a previous node that is connected to it, and/or buffers stored in memory and produce data buffers for the following nodes to process. Each buffer is divided into blocks and processed in parallel by SIMD processor as a thread. FIG. 1 shows an acyclic graph with m levels, the nodes are numbered as Nxy where x is the level of the node in the graph and y is the number of the node in that level.

GSP consists of multiple processors arrays. A processor array can execute multiple threads in parallel on the SIMD processors available in it. The processor array also tracks the data availability of the instructions of the threads and dispatch the instructions to the SIMD processors for execution when the data is available. The processors array has interfaces to the memory subsystem to access the data and to the thread scheduler for receiving the threads.

In GSP, the thread scheduler is responsible for scheduling and management of all the threads running on the processor arrays. For an embodiment, the thread scheduler is organized as a pipeline of thread scheduling hardware units called stages. Each stage is responsible for scheduling threads for all the nodes at a certain depth in the acyclic graph. For the example shown in the FIG. 1, stage-0 is responsible for dispatching threads of the nodes n-00, stage-1 schedules the threads for the node n-10 and node n-11 so on and so forth. The last stage of the pipeline is stage-N, where is N is fixed for a chip. The command buffer shown between two stages, is a buffer that consists of commands. Each command consists of thread index and pointer to an array of structures that holds pointers for the program kernel, and the input, output data buffers. Parent node can emit work as a multiple of child thread's work.

Figure 2:
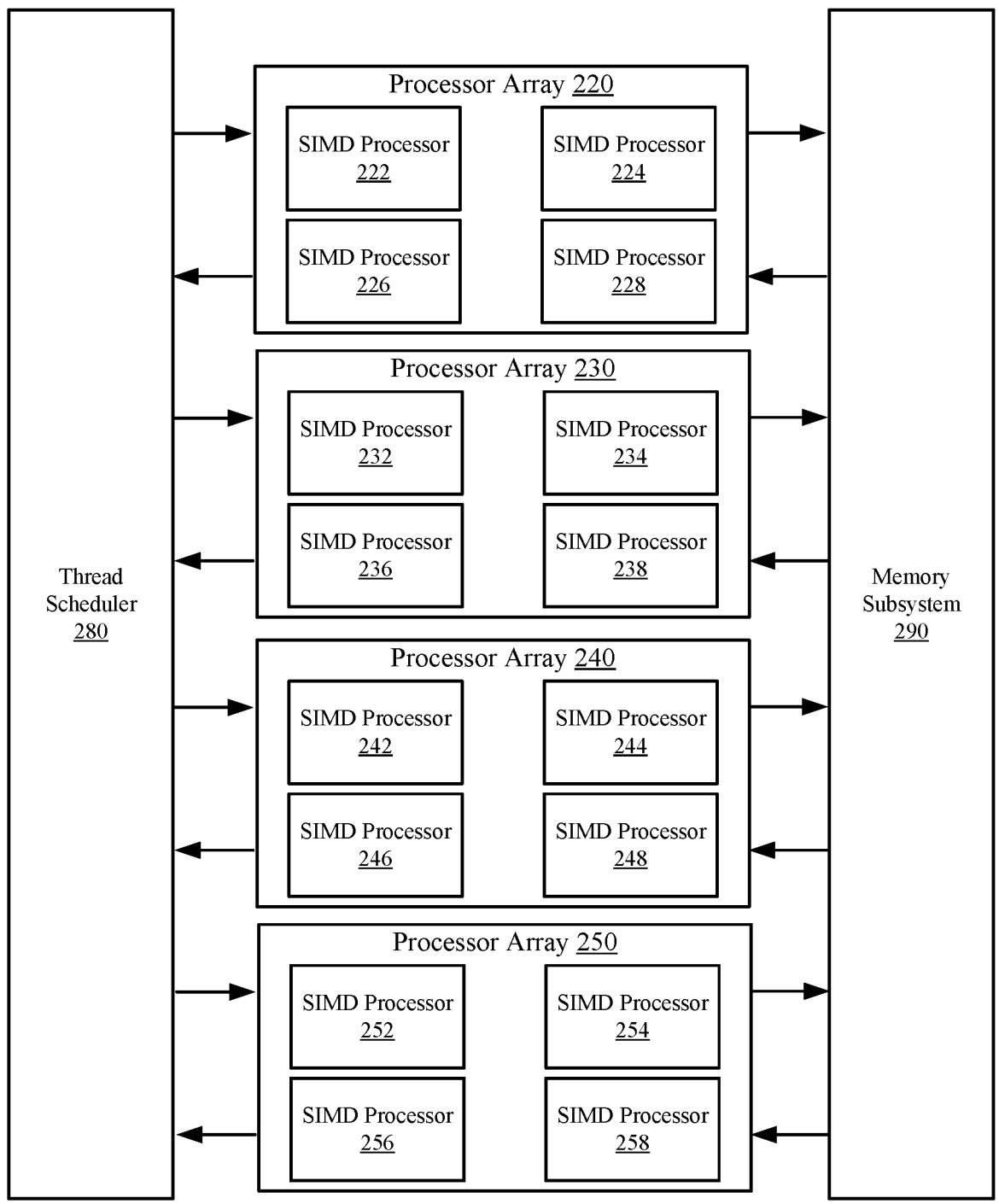
FIG. 2 shows multiple processor arrays of graph streaming processing, according to an embodiment.

FIG. 2 shows multiple processor arrays of graph streaming processing, according to an embodiment. As shown, multiple processor arrays 220, 230, 240, 250 each include a plurality of SIMD processors. For example, the processor array 220 includes SIMD processors 222, 224, 226, 228, the processor array 230 includes SIMD processors 232, 234, 236, 238, the processor array 240 includes SIMD processors 242, 244, 246, 248, and the processor array 250 includes SIMD processors 252, 254, 256, 258.

For an embodiment, a thread scheduler 280 of the Graph Steaming Processor is responsible for scheduling and management of all the threads running on the processor arrays 220, 230, 240, 250. For an embodiment, the scheduling and management include a group thread dispatch for the Graph Streaming Processor. For the group thread dispatch, for an embodiment, the thread scheduler 280 receives a group of threads of the Graph Streaming Processor, wherein the group of threads includes a plurality of threads which operate on a subset of inputs of an input tensor [I0-IN], wherein each of the plurality of threads operates on the subset of inputs of the input tensor and a weight tensor [W00-WNM] to generate an output tensor [O0-OM]. For an embodiment, the thread scheduler is configured to a calculate resource requirement for execution of the group of threads. Further, for an embodiment, the thread scheduler calculates a resource availability in a plurality of processors (for example, SIMD processors 222, 224, 226, 228) of each of a plurality of processor arrays 220, 230, 240, 250.

For an embodiment, the thread scheduler 280 is configured to dispatch the group of threads to a selected one of plurality of processors of processor arrays that has a resource availability that meets or exceeds the resource requirement for execution of the group of threads. For an embodiment, each thread of the group of threads is scheduled on a one processor of the selected plurality of processors and is processed independently on the one processor.

For an embodiment, the thread scheduler 280 is configured to schedule a group load instruction for all threads of the group of threads, comprising loading into a group load register a subset of inputs of the input tensor for processing of each thread of the group of threads, wherein the group load register provides the subset of the inputs of the input tensor to all of the plurality of processors of the selected processor array. For an embodiment, the processing of each thread of the group of threads comprises generating a subset of outputs of the output tensor for each thread of the plurality of threads based on a subset of weights of the weight tensor and the subset of inputs of the input tensor, which can be stored in a memory subsystem 290.

Resource Requirements

For an embodiment, calculating resource requirement for execution of the group of threads comprises determining the number of threads in the group of threads and determining the number of registers required by each thread of the group of threads.

For an embodiment, calculating resource availability in a plurality of processors of each of a plurality of processor arrays includes determining the available thread slots and determining the number of available registers in each processor of the plurality of processors 230 of each of the plurality of processor arrays 220.

Figure 3:
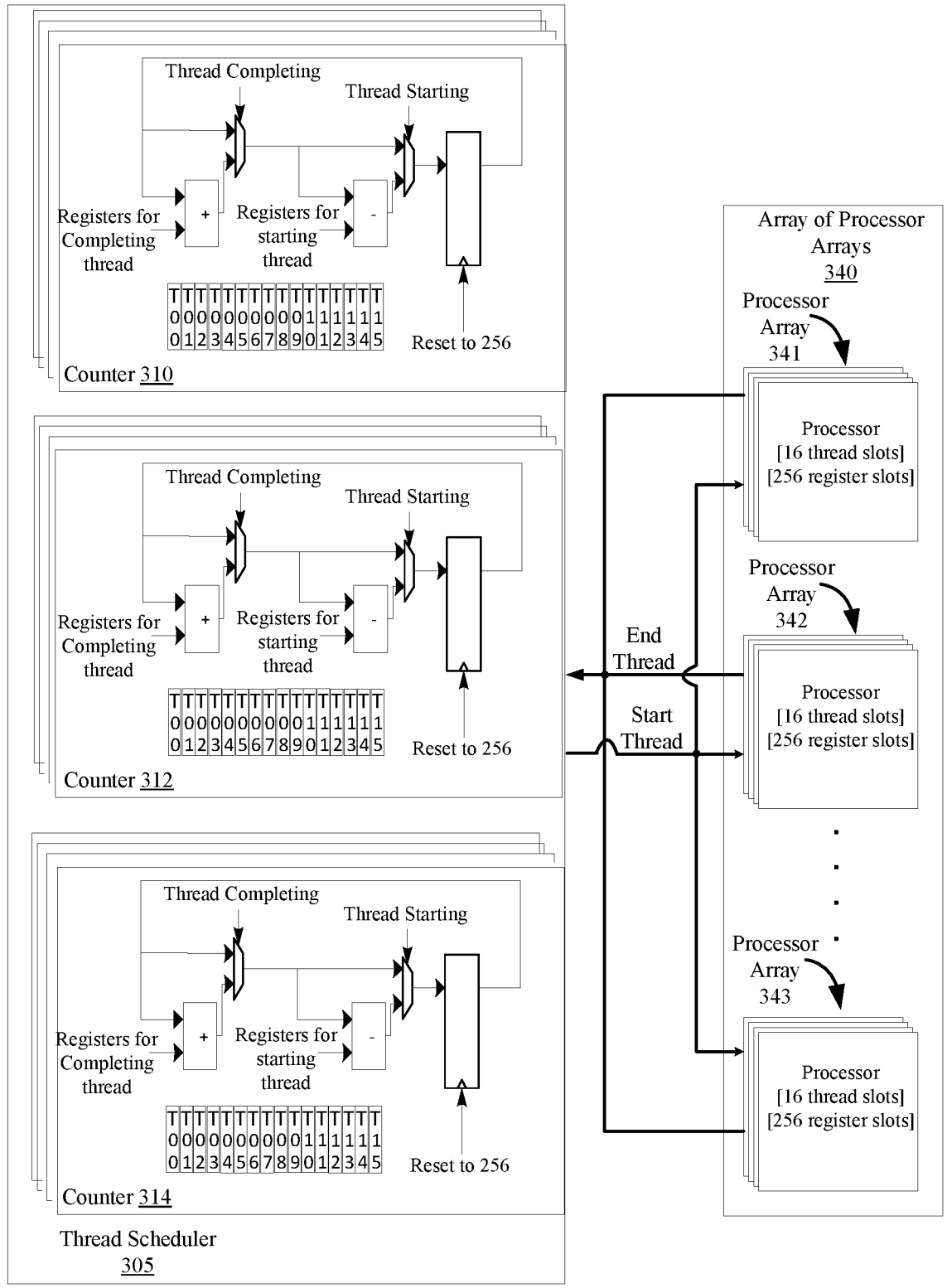
FIG. 3 shows a thread scheduler for an array of processor arrays that includes counters, according to an embodiment.

FIG. 3 shows a thread scheduler 305 for an array of processor arrays 340 that includes counters 310, 312, 314, according to an embodiment. For an embodiment, the thread scheduler 305 tracks the available thread slots and number of available registers in each processor of each processor array 341, 342, 343 of the array of processor arrays 340. For an embodiment, when the scheduler 305 is to schedule a thread, the scheduler 305 identifies the processor(s) in each processor of each processor array 341, 342, 343 of the array of processor arrays 340 which have at least one available thread slot and available registers exceeding the number of registers needed by the thread (of the group of threads). For an embodiment, one of the identified processor(s) is selected (for example, using a round-robin selection process of the processors which satisfy the thread requirements). For an embodiment, when the thread is scheduled on the selected processor, an appropriate thread slot is marked as in use and the available registers in the processor are decremented by the number of registers used by the thread. As the thread completes, the appropriate thread slot is marked as available and the number of available registers in the processor is incremented by the number of registers used by the retiring thread. For an embodiment, the scheduler 305 includes counters 310, 312, 314 that maintain a count of available registers in each processor of corresponding processor arrays 341, 342, 343. The number of available registers is decremented when starting a thread, and incremented when a thread is completed.

For an embodiment, when the scheduler 305 is scheduling a group of threads, the scheduler 305 identifies the processor array(s) (341, 342, 343) in the array of processor arrays 340 which have at least one available thread slot and available registers exceeding the number of registers needed by each thread of the group of threads in the processors of the processor array/s (341, 342, 343). One of identified processor array(s) (341, 342, 343) is picked (for example, using a round-robin selection process of the processor array(s) which satisfy the group of thread requirements). When the threads in the group of threads are scheduled on the processors of this processor array, the appropriate thread slots are marked as in use and the available registers in the processors of the processor array are decremented by the number of registers used by each thread of the group of threads. As the threads in the group of threads complete, the appropriate thread slots are marked as available and the available registers in the processors of the processor array are incremented by the number of registers used by each retiring thread of the group of threads. For an embodiment, the scheduler 305 includes counters 310, 312, 314 that maintain a count of available registers in each processor of corresponding processor arrays 341, 342, 343. As previously stated, the number of available registers is decremented when starting a thread, and incremented when a thread is completed. For an embodiment, there is a counter (such as, counters 310, 312, 314) for each processor of each processor array 341, 342, 343. For an embodiment, determining the available thread slots and determining the number of available registers in each processor of the plurality of processors of each of the plurality of processor arrays includes decrementing, by a counter of the thread scheduler corresponding with the processor, the number of available registers when starting a thread, and incrementing, by the counter of the thread scheduler corresponding with the processor, the number of available when a thread is completed.

Figure 4:
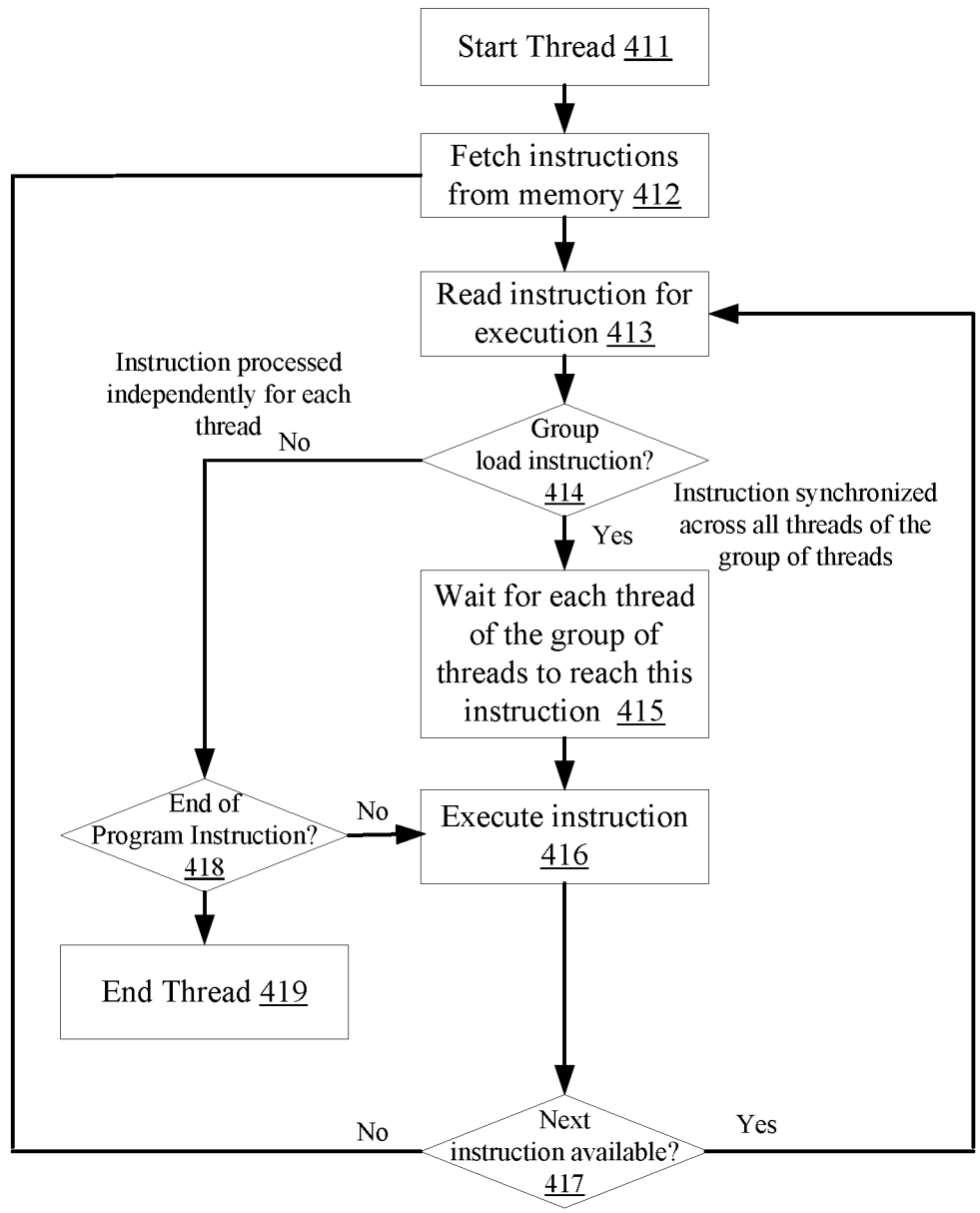
FIG. 4 is a flow chart of a method of executing a group load instruction, according to an embodiment.

FIG. 4 is a flow chart of a method of executing a group load instruction, according to an embodiment. A step 411 includes starting a thread of a group of threads. A step 412 includes fetching instructions of the thread from memory. A step 413 includes reading the instructions for execution. A step 414 includes determining whether the instruction for execution is a group load instruction. If yes, all threads of the group of threads are synchronized when executing the group load instruction by step 415 which includes waiting for each thread of the group of threads to reach this instruction. A step 416 includes executing the instruction, wherein all threads of the group of threads are synchronized when executing the group load instruction. As described, for an embodiment, all threads of the group of threads are synchronized when executing the group load instruction due to the waiting for each thread of the group to reach group load instruction for execution.

If execution of step 414 includes determining that the instruction for execution is not a group load instruction, then the threads are processed independently on the processor. Accordingly, for an embodiment, threads of the group of threads are processed independently on the selected one of the plurality of processors when not executing the group load instruction. If an instruction is not a group instruction (414) then a determination (418) is made to determine whether the instruction includes is an end of program instruction. If no, then the instruction is executed 416. If yes, then the thread ends 419.

For an embodiment, each thread of the group of threads is scheduled on one processor of the selected one of the plurality of processors. After execution of an instruction 416, it is determined 417 whether a next instruction is available.

As previously stated, for an embodiment, each thread of the group of threads is scheduled on a one processor of the selected plurality of processors and is processed independently on the one processor. For an embodiment, independently processing each thread of the group of threads on the one processor of the plurality of processors includes scheduling an instruction of one thread of the group of threads without relying on scheduling of an instruction of another thread of the group of threads.

For an embodiment, each thread includes an instance of a set of instructions running on a processor of the Graph Streaming Processor. For an embodiment, dispatching the group of threads to the plurality of processors of a one of the plurality of processor arrays comprising loading attributes of each thread of the group of threads to each of the available thread slots of a processor, wherein the attributes include a program pointer, pointer to the input tensor, pointer to the weight tensor, and pointer to the output tensor.

Figure 5:
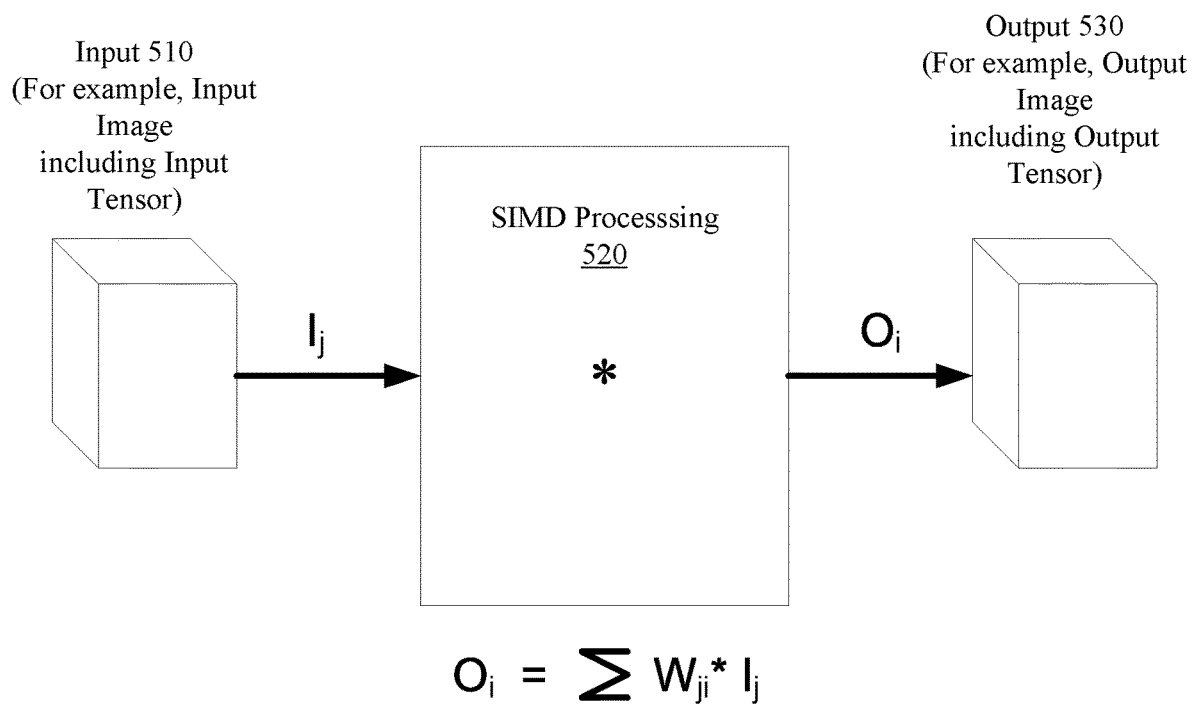
FIG. 5 shows SIMD (single input, multiple data) processing of an input tensor, resulting in an output tensor, according to an embodiment.

FIG. 5 shows SIMD (single input, multiple data) processing of an input tensor, resulting in an output tensor, according to an embodiment. The input 510 includes N−1 dimension of the N-dimensional input tensor $I_j$ and the output 530 includes N−1 dimension of the N-dimensional output tensor $O_i$. For an embodiment, the 3D input tensor $I_j$ is, for example, an array of 2D input images and the 3D output tensor $O_i$ is, for example, an array of 2D output images. SIMD processing 520 performs operations on the input tensor $I_j$ and generates the output tensor $O_i$.

For an embodiment, the SIMD processing 520 includes a SOMAC (Sum-Of-Multiply-Accumulate) instruction that performs, for example, a convolution of the subset of inputs of the input tensor $I_j$ with the subset of weights of a weight tensor $W_{ji}$. The SOMAC operation is represented in FIG. 1 as $O_i = \Sigma W_{ji} * I_j$.

For an embodiment, the 3D output tensor $O_i$ 530 generated by the SIMD processing also includes an array of 2D images.

Figure 6:
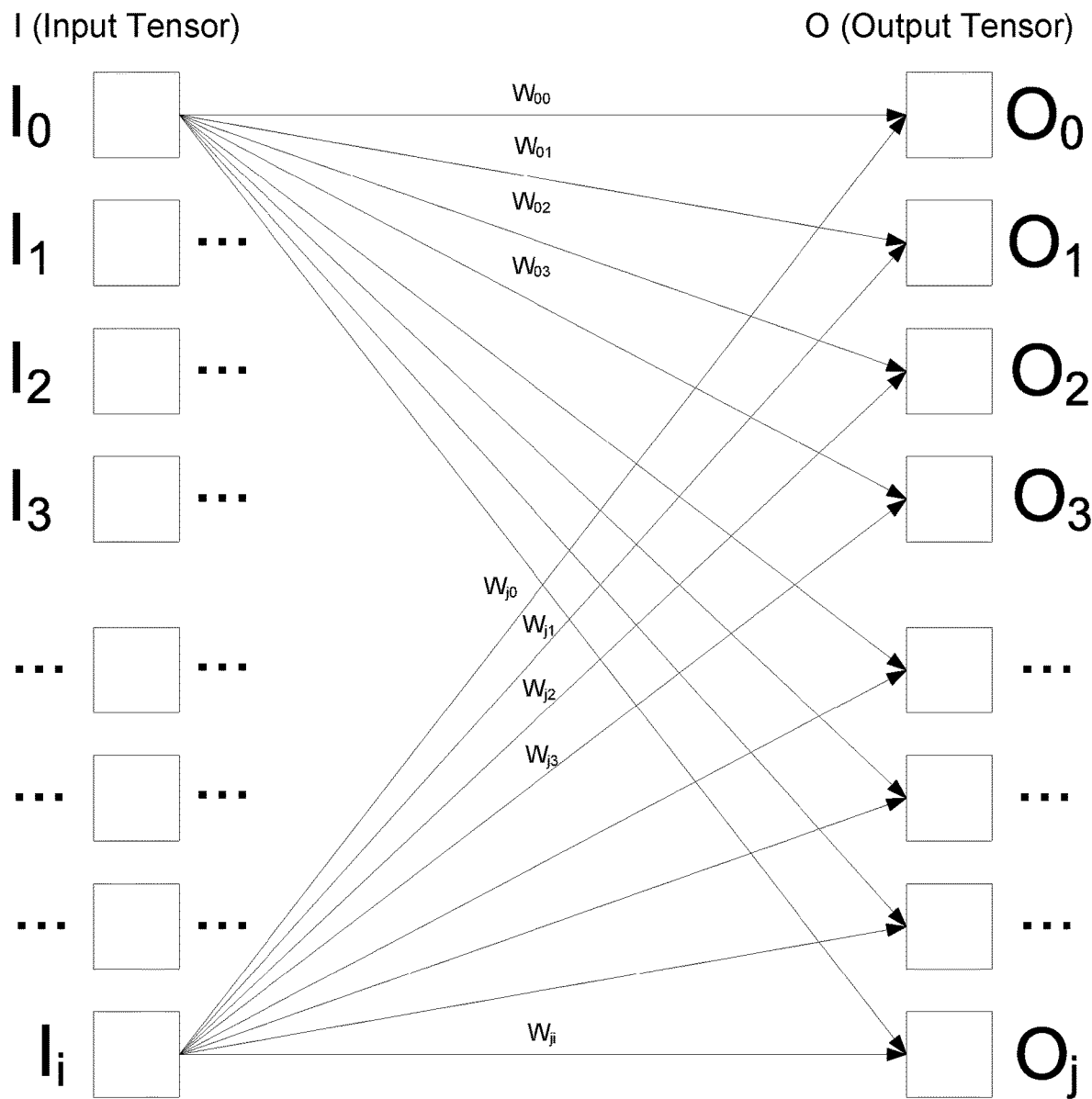
FIG. 6 shows another representation of SIMD (single input, multiple data) processing of an input tensor, resulting in an output tensor, according to an embodiment.

FIG. 6 shows another representation of SIMD (single input, multiple data) processing of an input tensor, resulting in an output tensor, according to an embodiment. As shown, the SIMD processing includes generating an output O of the output tensor $O_i$ based on all the inputs $I_j$ of the input tensor I and corresponding weights of the weight tensor $W_{ij}$.

Figure 7:
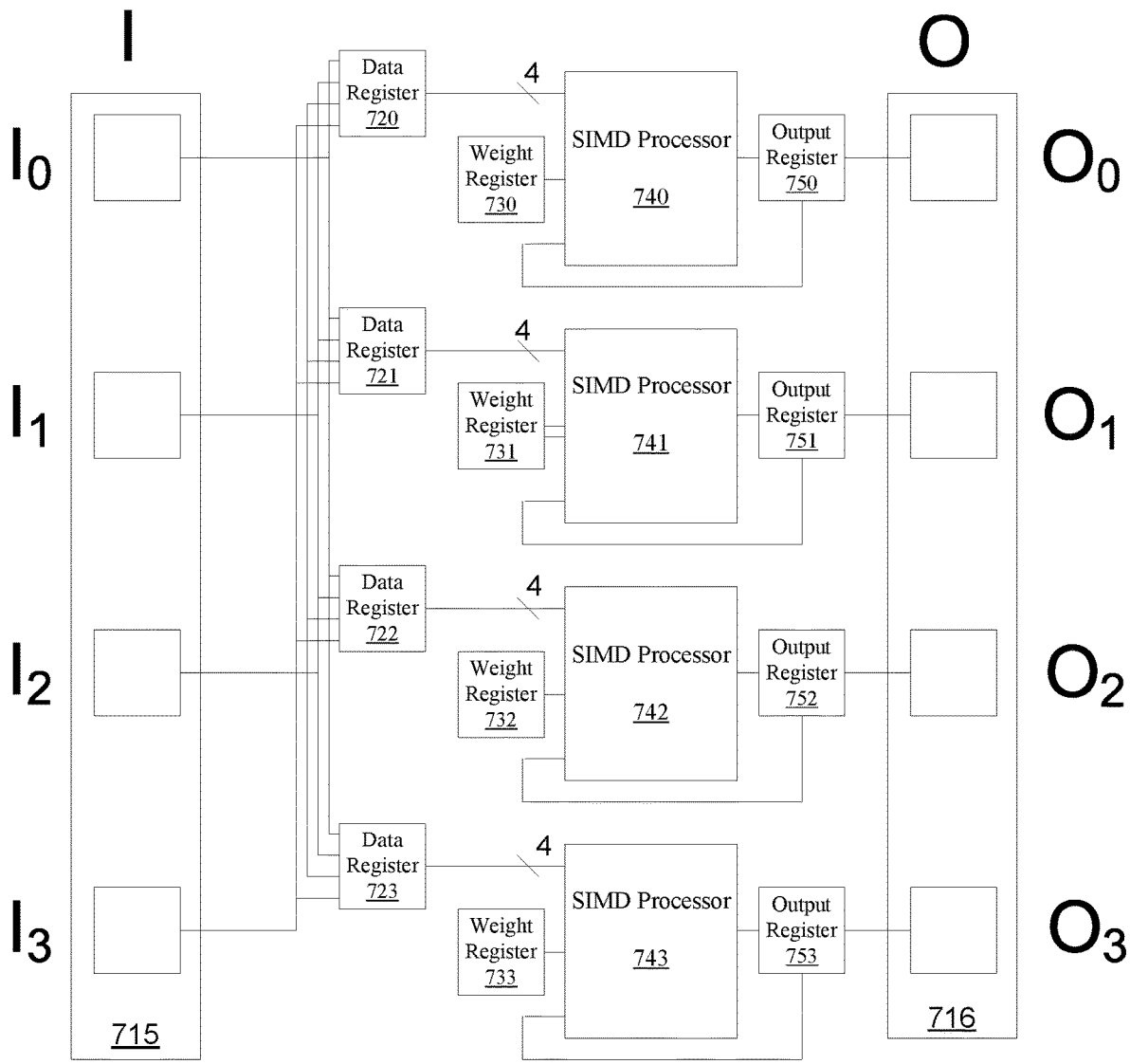
FIG. 7 shows a hardware architecture of a processor array that provides SIMD (single input, multiple data) processing of an input tensor, resulting in an output tensor, according to an embodiment.

FIG. 7 shows a hardware architecture of a processor array that provides SIMD (single input, multiple data) processing of an input tensor $I_j$, resulting in an output tensor $O_i$, according to an embodiment. The processor array of FIG. 7 could be, for example, one of the processor arrays 220, 230, 240, 250 of the multiple processor arrays of the GSP of FIG. 2.

As shown, data cache 715 (of the memory subsystem 290) includes the input tensors $I_j$, and data cache 716 (of the memory subsystem 290) includes the output tensor $O_i$. Further, the data cache (not shown) includes the weight tensor. While shown as separate cache 715, 716, for an embodiment, the cache 715, 716 are the same or common cache of the memory subsystem 290.

FIG. 7 shows only the first four inputs of the input tensor ($I_0, I_1, I_2, I_3$), but as described, there can be any number of $I_j$ inputs. Further, FIG. 7 only shows four outputs of the output tensor ($O_0, O_1, O_2, O_3$), but as described, there can be any number of outputs $O_i$. Further, any number of weights of the weight tensor $W_{ji}$ may be utilized.

As shown, the inputs ($I_0, I_1, I_2, I_3$) are each loaded input data registers 720, 721, 722, 723. Further, as shown, weights $W_{ji}$ are loaded into weight registers 730, 731, 732, 733. Through the input data registers 720, 721, 722, 723 and the weight registers 730, 731, 732, 733 the inputs ($I_0, I_1, I_2, I_3$) and the weights $W_{ji}$ are provided to a plurality (as shown, four) SIMD processors 740, 741, 742, 743 which perform a SOMAC instruction on the inputs ($I_0$, $I_1$, $I_2$, $I_3$) and the weights $W_{ji}$ yielding outputs ($O_0$, $O_1$, $O_2$, $O_3$) which are stored in output registers 750, 751, 752, 753.

As will be shown and described, for at least some embodiments, the SIMD processing of the SIMD processors 740, 741, 742, 743 includes a dot-product-accumulate operation, or a convolve multiple and accumulate operation which can also be referred to as a Sum-Of-Multiply-Accumulate (SOMAC).

Figure 8:
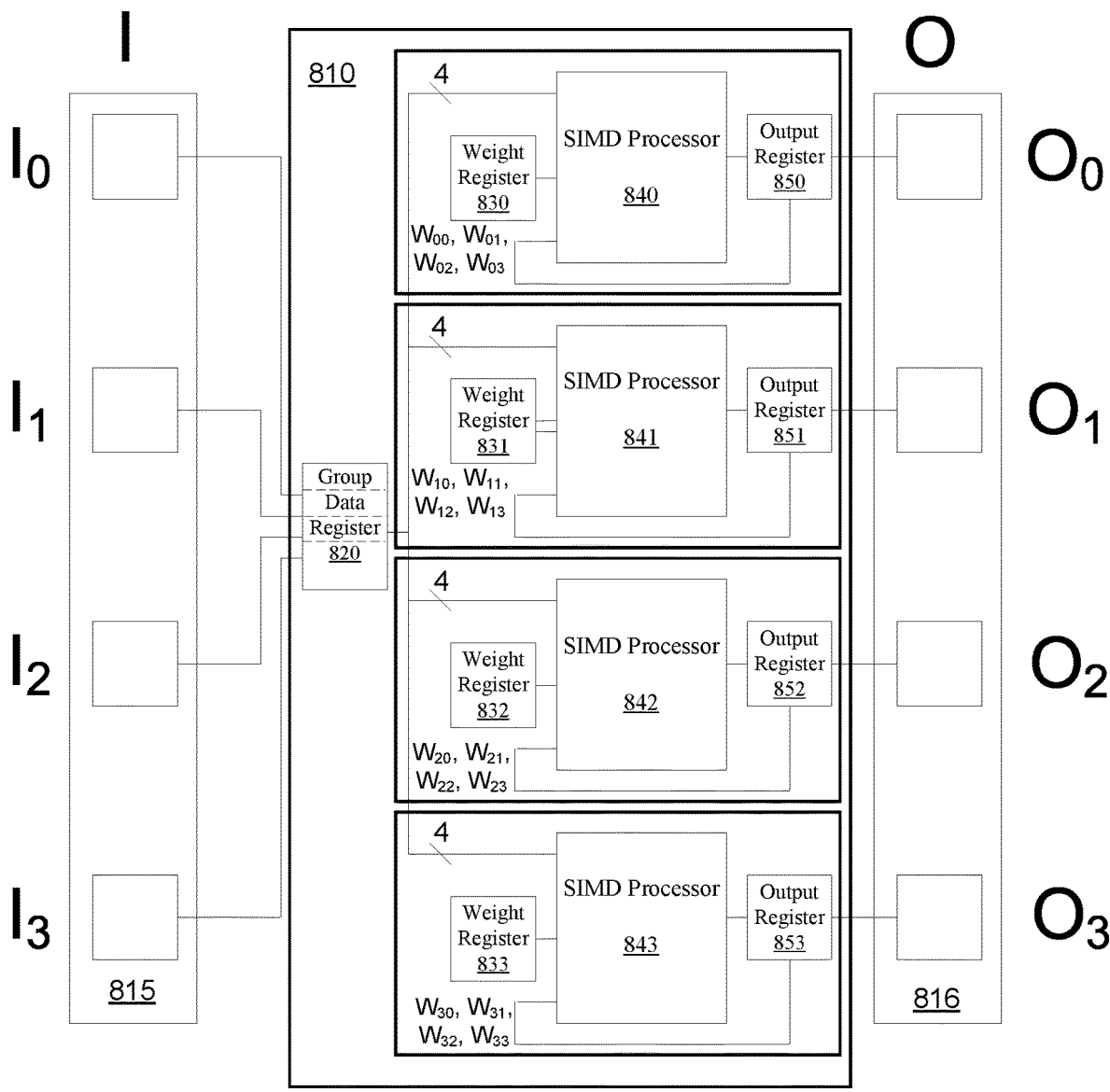
FIG. 8 shows a hardware architecture of a processor array that provides SIMD (single input, multiple data) processing of an input tensor that includes a group load register, resulting in an output tensor, according to an embodiment.

FIG. 8 shows a hardware architecture of a processor array 810 that provides SIMD (single input, multiple data) processing of an input tensor that includes a group load register 820, resulting in an output tensor, according to an embodiment. The processor array 810 of FIG. 8 could be, for example, one of the processor arrays 220, 230, 240, 250 of the multiple processor array of the GSP of FIG. 2.

As can be observed in FIG. 7, if the data registers 720, 721, 722, 723 all have the same set of inputs ($I_0$, $I_1$, $I_2$, $I_3$) loaded into them, then as shown in FIG. 8, a group load register 820 may be utilized, which reduces the number of registers used. Utilizing the group load register 820 over the data registers 720, 721, 722, 723 enables improving the compute-to-bandwidth ratio and as a result reduces the amount of circuitry which reduces power consumption, space, and cost.

As shown in FIG. 8, the hardware architecture provides a graph streaming processor that includes a data cache 815, 816. The data cache 815 is used for the inputs ($I_0$, $I_1$, $I_2$, $I_3$). The data cache 816 is used for outputs ($O_0$, $O_1$, $O_2$, $O_3$) generated by the graph streaming processing.

Further, the graph streaming processor includes a plurality of SIMD processors 840, 841, 842, 843.

For an embodiment, the group load register 820 operate to load a subset of inputs ($I_0$, $I_1$, $I_2$, $I_3$) of the input tensor $I_j$, wherein the group load register 820 provides the subset of inputs ($I_0$, $I_1$, $I_2$, $I_3$) of the input tensor to all of the plurality of processors 840, 841, 842, 843.

For an embodiment, a plurality of weight data registers 830, 831, 832, 833 operate to load a subset of the weights of the weight tensor $W_{ji}$, wherein each of the plurality of weight data registers 830, 831, 832, 833 provides an input to a single of the plurality of processors 840, 841, 842, 843. For example, weights $W_{00}$, $W_{01}$, $W_{02}$, $W_{03}$ may be loaded into weight register 830 which provides an input to the processor 840. Weights $W_{10}$, $W_{11}$, $W_{12}$, W 13 may be loaded into weight register 831 which provides an input to processor 841. Weights $W_{20}$, $W_{21}$, $W_{22}$, $W_{23}$ may be loaded into weight register 832 which provides an input to processor 842. Finally, weights $W_{30}$, $W_{31}$, $W_{32}$, $W_{33}$ may be loaded into weight register 833 which provides an input to processor 843.

For at least some embodiments, the plurality of processors 840, 841, 842, 843 operate to perform a SOMAC (Sum-Of-Multiply-Accumulate) instruction, including each of the plurality of processors 840, 841, 842, 843 simultaneously operating to determine an instruction size of the SOMAC instruction, wherein the instruction size indicates a number of iterations that the SOMAC instruction is to be executed and is equal to a number of outputs within a subset ($O_0$, $O_1$, $O_2$, $O_3$) of the output tensor $O_i$. As will be described further, for an embodiment, the instruction size is determined by a macro-instruction iterator of the graph streaming processor, and further it is determined whether the instruction is a Sum-Of-Multiply-Accumulate (SOMAC) instruction.

For at least some embodiments, each of the plurality of processors 840, 841, 842, 843 further simultaneously operate to read a first source operand of a plurality of source operands of the SOMAC instruction from the group load register file 820, wherein the first source operand is one of the subset of inputs ($I_0$, $I_1$, $I_2$, $I_3$) of the input tensor. That is, the first source operand of the SOMAC instruction is one of the subset of inputs $I_0$, $I_1$, $I_2$, or $I_3$ of the input tensor.

For at least some embodiments, each of the plurality of processors 840, 841, 842, 843 further simultaneously operates to read a second source operand of the plurality of source operands of the SOMAC instruction from the weight register file wherein the second source operand is one of the subset of weights of the weight tensor. That is, the second source operand of the SOMAC instruction is one of the subset of weights of the weight tensor $W_{ji}$.

For at least some embodiments, each of the plurality of processors 840, 841, 842, 843 further simultaneously operate to execute multiply and accumulate operations of the SOMAC operation for the number of iterations.

For at least some embodiments, each of the plurality of processors 840, 841, 842, 843 further operate to read a destination operand of the plurality of operands of the SOMAC instruction from one of an output registers 850, 851, 852, 853 wherein the destination operand is one of the subset of the output tensor. Further, each of the plurality of processors 840, 841, 842, 843 further operate to add a sum-of-multiply result to the destination operand, and write a multiply-accumulate result back to the destination operand, wherein the destination operand is a register from the output register file that is an output of the instruction. After this operation, the sum-of-multiply result will be different. If the result would not have been different, then the operation would have been pruned.

For at least some embodiments, a size (number of registers) of the group load register 820 is dependent on a number of inputs within the subset of the input tensor.

For at least some embodiments, a size (number of registers) of the group load register 820 is dependent on a number of threads concurrently running on the plurality of processors.

For at least some embodiments, a size (number of registers) of the output registers 850, 851, 852, 853 is dependent on a number of outputs within the subset of the output tensor.

For at least some embodiments, a size (number of registers) of the output registers 850, 851, 852, 853 is dependent on a number of threads concurrently running on the plurality of processors.

For at least some embodiments, a size (number of registers) of the weight registers 830, 831, 832, 833 is dependent on a number of inputs within the subset of the input tensor.

For at least some embodiments, a size (number of registers) of the weight registers 830, 831, 832, 833 is dependent on a number of outputs within the subset of the output tensor.

For at least some embodiments, a size (number of registers) of the weight registers 830, 831, 832, 833 is dependent on a number of threads concurrently running on the plurality of processors.

FIG. 9 is a flow chart that includes steps of a method of graph streaming processing that includes a group load register, according to an embodiment. A first step 910 includes receiving, by a thread scheduler of the graph streaming processor, a group of threads, wherein the group of threads comprises a plurality of threads which operate on an input tensor, wherein each of the plurality of threads operates on the inputs of the input tensor and a subset of a weight tensor to generate a subset of an output tensor. A second step 920 includes calculating by the thread scheduler, a resource requirement for execution of the group of threads.

A third step 930 includes calculating, by the thread scheduler, resource availability in a plurality of processors of each of a plurality of processor arrays. A fourth step 940 includes dispatching the group of threads to a selected one of the plurality of processors of the plurality of processor arrays that has a resource availability that meets or exceeds the resource requirement for execution of the group of threads. A fifth step 950 includes scheduling a group load instruction for all threads of the group of threads, comprising loading into a group load register a subset of inputs of the input tensor for processing of each thread of the group of threads, wherein the group load register provides the subset of the inputs of the input tensor to the group of threads of the selected one of the plurality of processors, wherein all threads of the group of threads are synchronized when executing the group load instruction, wherein all threads of the group of threads are processed independently on the selected one of the plurality of processors when not executing the group load instruction, and wherein the processing of each thread of the group of threads comprises generating a subset of outputs of the output tensor for each thread of the plurality of threads based on the subset of weights of the weight tensor and the inputs of the input tensor.

For an embodiment, each thread of the group of threads is scheduled on one processor of the selected one of the plurality of processors.

As previously described, for an embodiment, calculating resource requirement for execution of the group of threads includes determining the number of threads in the group of threads and determining the number of registers required by each thread of the group of threads. For an embodiment, calculating resource availability in a plurality of processors of each of a plurality of processor arrays includes determining the available thread slots and determining the number of available registers in each processor of the plurality of processors of each of the plurality of processor arrays. For an embodiment, determining the available thread slots and determining the number of available registers in each processor of the plurality of processors of each of the plurality of processor arrays includes decrementing, by a counter of the thread scheduler corresponding with the processor, the number of available registers when starting a thread, and incrementing, by the counter of the thread scheduler corresponding with the processor, the number of available when a thread is completed.

As previously described, for an embodiment, when the scheduler 305 is scheduling a group of threads, the scheduler 305 identifies the processor array(s) (341, 342, 343) in the array of processor arrays 340 which have at least one available thread slot and available registers exceeding the number of registers needed by each thread of the group of threads in the processors of the processor array/s (341, 342, 343). One of identified processor array(s) (341, 342, 343) is picked (for example, using a round-robin selection process of the processor array(s) which satisfies the group of thread requirements). When the threads in the group of threads are scheduled on the processors of this processor array, the appropriate thread slots are marked as in use and the available registers in the processors of the processor array are decremented by the number of registers used by each thread of the group of threads. As the threads in the group of threads complete, the appropriate thread slots are marked as available and the available registers in the processors of the processor array are incremented by the number of registers used by each retiring thread of the group of threads.

As previously described, for an embodiment, determining the available thread slots and determining the number of available registers in each processor of the plurality of processors of each of the plurality of processor arrays includes decrementing, by a counter of the thread scheduler corresponding with the processor, the number of available registers when starting a thread, and incrementing, by the counter of the thread scheduler corresponding with the processor, the number of available when a thread is completed.

As previously described, for an embodiment, independently processing each thread of the group of threads on the one processor of the plurality of processors comprises scheduling an instruction of one thread of the group of threads without relying on scheduling of an instruction of another thread of the group of threads As previously described, for an embodiment, each thread includes an instance of a set of instructions running on a processor of the graph streaming processor.

As previously described, for an embodiment, dispatching the group of threads to the plurality of processors of a one of the plurality of processor arrays comprising loading attributes of each thread of the group of threads to each of the available thread slots of a processor, wherein the attributes include a program pointer, pointer to the input tensor, pointer to the weight tensor, and pointer to the output tensor.

As previously described, at least some embodiments further include loading, by a plurality of weight data registers, a subset of weights of the weight tensor, wherein each of the weight data registers provide a weight to a single of the plurality of processors, and performing, by the plurality of processors, a SOMAC (Sum-Of-Multiply-Accumulate) instruction, including simultaneously determining, by each of the plurality of processors, an instruction size of the SOMAC instruction, wherein the instruction size indicates a number of iterations that the SOMAC instruction is to be executed and is equal to a number of outputs within a subset of the output tensor.

As previously described, at least some embodiments further include reading, by each of the plurality of processors, a first source operand of a plurality of source operands of the SOMAC instruction from the group load register file, wherein the first source operand is one of the subset of inputs of the input tensor. As previously described, at least some embodiments further include reading, by each of the plurality of processors, a second source operand of the plurality of source operands of the SOMAC instruction from the weight register file wherein the second source operand is one of the subset of the weights of the weight tensor. As previously described, at least some embodiments further include executing, by each of the plurality of processors, multiply and accumulate operations of the SOMAC operation for the number of iterations.

At least some embodiment further include reading, by each of the plurality of processors, a destination operand of the plurality of operands of the SOMAC instruction from the output register file, wherein the destination operand is one of the subset of outputs of the output tensor, adding, by each of the plurality of processors, a sum-of-multiply result to the destination operand, and writing, by each of the plurality of processors, the multiply-accumulate result back to the destination operand, wherein the destination operand is a register from the output register file that is an output of the instruction.

At least some embodiment further include loading, by a second group load register, a second subset of the inputs of the input tensor, wherein the second group load register provides the second subset of the inputs of the input tensor to all of a second plurality of processors, loading, by a second plurality of weight registers, a second subset of the weights of the weight tensor, wherein each of the second plurality of weight data registers provide a weight to a single of the second plurality of processors, and performing, by the second plurality of processors, the SOMAC (Sum-Of-Multiply-Accumulate) instruction, including each of the second plurality of processors simultaneously determining the instruction size of the SOMAC instruction, wherein the instruction size indicates a number of iterations that the SOMAC instruction is to be executed and is equal to a number of outputs within a second subset of the output tensor. For an embodiment, a size of the group register is dependent on a number of inputs within the subset of inputs of the input tensor.

Although specific embodiments have been described and illustrated, the described embodiments are not to be limited to the specific forms or arrangements of parts so described and illustrated. The embodiments are limited only by the appended claims.

What is claimed:

1. A method of group thread dispatch for a graph streaming processor, comprising
    receiving, by a thread scheduler of the graph streaming processor, a group of threads, wherein the group of threads comprises a plurality of threads which operate on an input tensor, wherein each of the plurality of threads operates on inputs of the input tensor and a subset of a weight tensor to generate a subset of an output tensor;
    calculating by the thread scheduler, a resource requirement for execution of the group of threads;
    calculating, by the thread scheduler, resource availability in a plurality of processors of each of a plurality of processor arrays;
    dispatching the group of threads to a selected one of the plurality of processors of the plurality of processor arrays that has a resource availability that meets or exceeds the resource requirement for execution of the group of threads; and
    scheduling a group load instruction for all threads of the group of threads, comprising:
    loading into a group load register a subset of inputs of the input tensor for processing of each thread of the group of threads, wherein the group load register provides the subset of the inputs of the input tensor to the group of threads of the selected one of the plurality of processors;
    wherein all threads of the group of threads are synchronized when executing the group load instruction;
    wherein all threads of the group of threads are processed independently on the selected one of the plurality of processors when not executing the group load instruction;
    wherein the processing of each thread of the group of threads comprises generating a subset of outputs of the output tensor for each thread of the plurality of threads based on the subset of weights of the weight tensor and the inputs of the input tensor.

2. The method of claim 1, wherein each thread of the group of threads is scheduled on one processor of the selected one of the plurality of processors.

3. The method of claim 1, wherein calculating resource requirement for execution of the group of threads comprises determining the number of threads in the group of threads and determining the number of registers required by each thread of the group of threads.

4. The method of claim 1, wherein calculating resource availability in the plurality of processors comprises determining the available thread slots and determining the number of available registers in each processor of the plurality of processors of each of the plurality of processor arrays.

5. The method of claim 4, wherein determining the available thread slots and determining the number of available registers in each processor of the plurality of processors of each of the plurality of processor arrays comprises:
    decrementing, by a counter of the thread scheduler corresponding with the processor, the number of available registers when starting a thread; and
    incrementing, by the counter of the thread scheduler corresponding with the processor, the number of available when a thread is completed.

6. The method of claim 1, wherein independently processing all threads of the group of threads comprises scheduling an instruction of one thread of the group of threads without relying on scheduling of an instruction of another thread of the group of threads.

7. The method of claim 1, wherein each thread includes an instance of a set of instructions running on a processor of the graph streaming processor.

8. The method of claim 1, wherein dispatching the group of threads to the plurality of processors of a one of the plurality of processor arrays comprising loading attributes of each thread of the group of threads to each of the available thread slots of a processor, wherein the attributes include a program pointer, pointer to the input tensor, pointer to the weight tensor, and pointer to the output tensor.

9. The method of claim 1, further comprising:
    loading, by a plurality of weight data registers, the subset of weights of the weight tensor, wherein each of the weight data registers provide a weight to a single of the plurality of processors;
    performing, by the plurality of processors, a SOMAC (Sum-Of-Multiply-Accumulate) instruction, including:
    simultaneously determining, by each of the plurality of processors, an instruction size of the SOMAC instruction, wherein the instruction size indicates a number of iterations that the SOMAC instruction is to be executed and is equal to a number of outputs within a subset of the output tensor.

10. The method of claim 9, further comprising:
    reading, by each of the plurality of processors, a first source operand of a plurality of source operands of the SOMAC instruction from the group load register file, wherein the first source operand is one of the subset of inputs of the input tensor.

11. The method of claim 10, further comprising:
    reading, by each of the plurality of processors, a second source operand of the plurality of source operands of the SOMAC instruction from the weight register file wherein the second source operand is one of the subset of the weights of the weight tensor.

12. The method of claim 10, further comprising:
    executing, by each of the plurality of processors, multiply and accumulate operations of the SOMAC operation for the number of iterations.

13. A graph streaming processor, comprising:
    plurality of processor arrays, each of the plurality of processor arrays comprising a plurality of processors; and
    a thread scheduler configured to:
    receive a group of threads of the graph streaming processor, wherein the group of threads comprises a plurality of threads which operate on an input tensor, wherein each of the plurality of threads operates on the inputs of the input tensor and a subset of a weight tensor to generate a subset of an output tensor;

calculate a resource requirement for execution of the group of threads;

calculate resource availability in a plurality of processors of each of a plurality of processor arrays;

dispatch the group of threads to a selected one of the plurality of processors of the plurality of processor arrays that has a resource availability that meets or exceeds the resource requirement for execution of the group of threads;

schedule a group load instruction for all threads of the group of threads, comprising:

loading into a group load register a subset of inputs of the input tensor for processing of each thread of the group of threads, wherein the group load register provides the subset of the inputs of the input tensor to the group of threads of the selected one of the plurality of processors;

wherein all threads of the group of threads are synchronized when executing the group load instruction;

wherein all threads of the group of threads are processed independently on the selected one of the plurality of processors when not executing the group load instruction;

wherein the processing of each thread of the group of threads comprises generating a subset of outputs of the output tensor for each thread of the plurality of threads based on the subset of weights of the weight tensor and the inputs of the input tensor.

14. The graph streaming processor of claim 13, wherein calculating resource requirement for execution of the group of threads comprises determining the number of threads in the group of threads and determining the number of registers required by each thread of the group of threads.

15. The graph streaming processor of claim 13, wherein calculating resource availability in a plurality of processors of each of a plurality of processor arrays comprises determining the available thread slots and determining the number of available registers in each processor of the plurality of processors of each of the plurality of processor arrays.

16. The graph streaming processor of claim 13, wherein independently processing each thread of the group of threads on the one processor of the plurality of processors comprises scheduling an instruction of one thread of the group of threads without relying on scheduling of an instruction of another thread of the group of threads.

17. The graph streaming processor of claim 13, wherein each thread includes an instance of a set of instructions running on a processor of the Graph Streaming Processor.

18. The graph streaming processor of claim 13, wherein dispatching the group of threads to the plurality of processors of a one of the plurality of processor arrays comprising loading attributes of each thread of the group of threads to each of the available thread slots of a processor, wherein the attributes include a program pointer, pointer to the input tensor, pointer to the weight tensor, and pointer to the output tensor.

19. The graph streaming processor of claim 13, further comprising:

a plurality of weight data registers configured to load a subset of weights of the weight tensor, wherein each of the weight data registers provide a weight to a single of the plurality of processors;

wherein the plurality of processors are configured to perform a SOMAC (Sum-Of-Multiply-Accumulate) instruction, including simultaneously determining an instruction size of the SOMAC instruction, wherein the instruction size indicates a number of iterations that the SOMAC instruction is to be executed and is equal to a number of outputs within a subset of the output tensor.

20. The graph streaming processor of claim 19, wherein each of the plurality of processors is configured to read a first source operand of a plurality of source operands of the SOMAC instruction from the group load register file, wherein the first source operand is one of the subset of inputs of the input tensor.

* * * * *